2,819,264
Patented Jan. 7, 1958

2,819,264
STEROID INTERMEDIATES

David H. Gould, Leonia, and Hershel L. Herzog, Mountain View, N. J., assignors to Schering Corporation, Bloomfield, N. J., a corporation of New Jersey No Drawing. Application January 26, 1956
Serial No. 561,686

8 Claims. (Cl. 260—239.55)

This invention relates to a new group of unsaturated steroid compounds which are useful intermediates in the preparation of therapeutically active substances and to methods for their manufacture. More particularly, this invention relates to 1,4,6-pregnatrienes possessing a 9β-11β-epoxide link. The compounds of our invention may be represented by the following general formula:

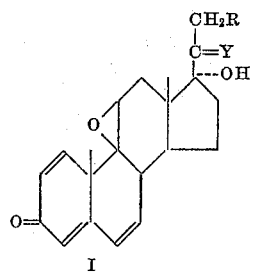

I wherein R is a member of the group consisting of H, OH and acyl and Y is a member of the group consisting of O,

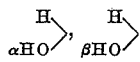

The compounds of the general formula are useful intermediates in the preparation of 9α-halo-1,4,6-pregnatrienes having various substituents characteristic of adrenal cortical hormones. Specifically, in the copending application of Gould and Herzog, Serial No. 513,901, filed June 7, 1955, there is disclosed 9α-fluoro-1,4,6-pregnatriene-17α,21-diol-3,11,20-trione and the corresponding 11-hydroxyl analogs, together with their esters, which are set forth as possesssing adrenal cortical hormone activity and as intermediates in the manufacture of compounds having adreno-cortical activity. In addition, in the continuation-in-part application of Gould and Herzog, Serial No. 580,475, filed April 25, 1956, there is further amplification of the anti-inflammatory properties of the 9α-halo-1,4,6-pregnatrienes possessing an oxygen function at C–3, 11, 17, 20 and 21.

In addition to being useful intermediates, some of the compounds of the general formula, especially those possessing a 20-keto-21-hydroxyl function are therapeutically useful per se in that they exhibit adrenocortical properties which may be utilized in the treatment of inflammatory diseases.

Thus, an object of our invention is to provide chemical intermediates which can be easily converted into therapeutically useful substances. The 20-keto compounds of our invention may be prepared in the following manner:

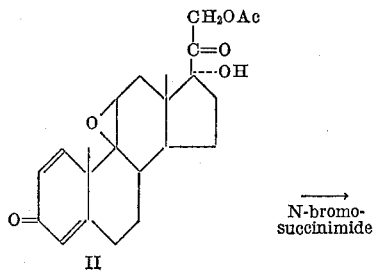

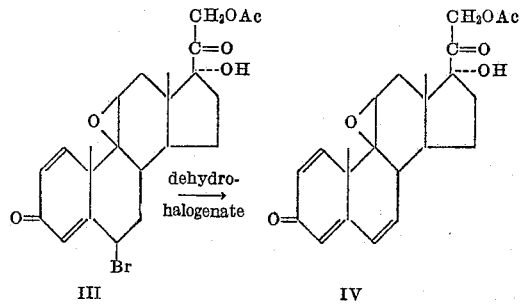

In the above sequence, the starting material, 9β,11β-oxido-1,4-pregnadiene-17α,21-diol-3,20-dione - 21 - acetate (II) is prepared according to the procedure described in the copending application of Herzog and Gould, Serial No. 460,508, filed October 5, 1954, and in the publication of Fried et al., J. A. C. S. 77: 481 (1955). It is to be noted that the 21-acetate is used merely by way of example, however, other esters in the 21-position serve equally well. Treatment of II with a source of halogen radical such as N-bromo-succinimide affords the intermediate 6-bromo-9β,11β-oxido-1,4-pregnadiene-17α, 21-diol-3,20-dione-21-acetate (III). Dehydrohalogenation in the usual manner, such as heating the 6-bromo compound (III) in the presence of an organic base, such as collidine, or treatment of III with a silver salt in an organic base affords the 1,4,6-pregnatriene described by Formula IV.

Alternatively, the compounds of the general formula may be prepared according to the following equations:

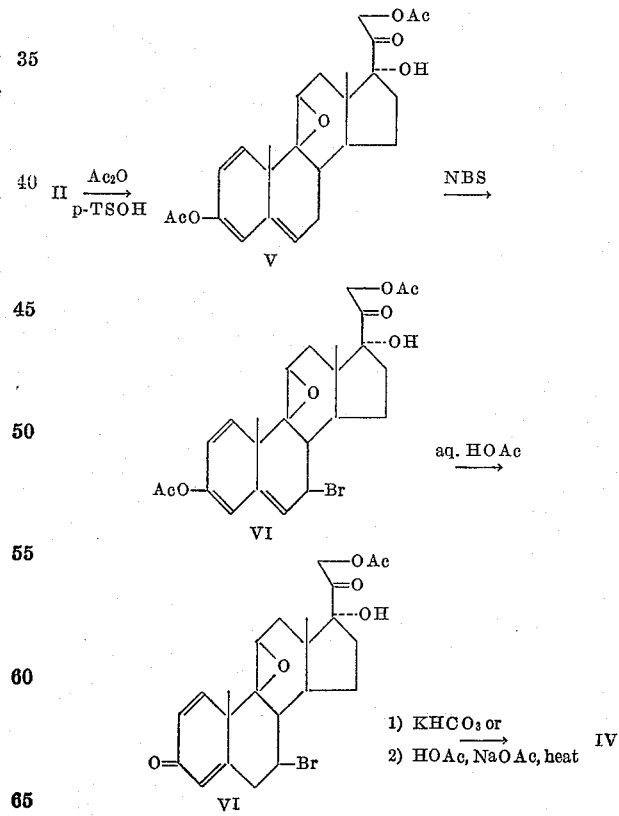

In this process, the epoxy-pregnadiene (II) is treated with an acylating agent in the presence of a strong acid such as acetic anhydride and p-toluenesulfonic acid whereby enol-acetylation occurs as shown by compound V. In the formation of the enol acetate V, the shifting of the double bond and the insertion of the additional bond between C-5 and C-6 activates the C-7 position. Thus reaction of V with halogen radical such as is supplied by N-bromosuccinimide or N-chloroacetamide gives rise to the corresponding C-7 halogenated compound VI. Hydrolysis of the enol-acetate, regenerating the original ketone function, is easily accomplished by refluxing VI with aqueous acetic acid, for example. This hydrolysis causes a reshifting of the bonds and re-establishes the 3-keto-$\Delta^{1,4}$ system as exemplified by VII. The halogen substituent at C-7 in VII is in a very favorable position for dehydrohalogenation so as to form a double bond in conjugation with the 3-keto-$\Delta^{1,4}$ system. For example, treatment of VII with a mild dehydrohalogenating agent, such as potassium bicarbonate, or sodium acetate in acetic acid, preferably with gentle heating, causes rapid elimination of hydrogen bromide from the molecule and affords the 1,4,6-triene of our invention (IV).

In addition to the foregoing, we have found the following process to be applicable in the preparation of the epoxy compounds:

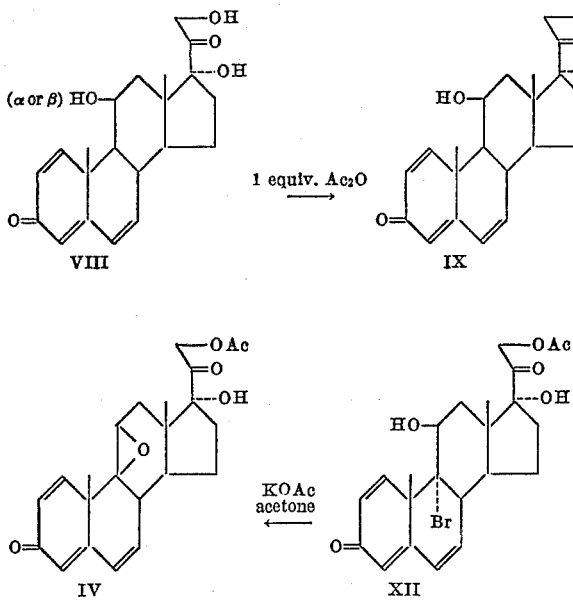
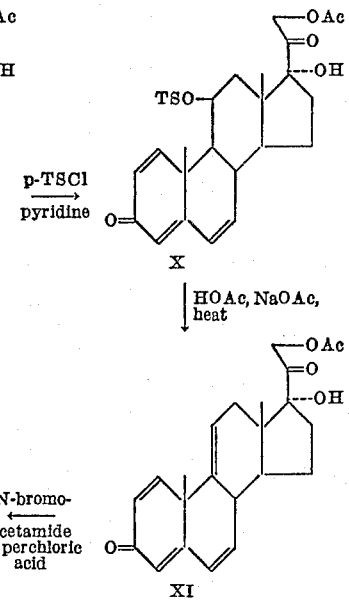

In this sequence, we employ 1,4,6-pregnatriene-11α,17α,-21-triol-3,20-dione (VIII) as starting material which is prepared as described in copending application of Gould and Herzog, Serial No. 513,901, filed June 7, 1955. Acylating VIII with one equivalent of acetic anhydride, for example, gives rise to the corresponding 21-acetate (IX), which on further treatment with a sulfonic acid derivative affords a C-11 sulfonic acid ester. Although we have indicated the preferred agent to be p-toluenesulfonyl chloride in the present of pyridine, other agents such as benzenesulfonyl chloride, methanesulfonyl chloride, and the like, may be used with equal advantage. The tetraene, XI, is formed in the usual manner from the tosylate, X, by heating the latter in the presence of sodium acetate and acetic acid. A hypohalous acid is added across the 9,11-double bond in a known manner such as by treating XI with N-bromacetamide in the presence of perchloric acid giving rise to the 9α-bromo-11β-hydroxyl pregnadiene, XII. Epoxidation at the C-9,11-position is conveniently carried out by warming the bromhydrin, XII, with potassium acetate, for example, in an acetone solution, thus generating IV.

The compounds of the general formula are easily converted to the corresponding 9α-halo-11β-hydroxy pregnatrienes by treating same with the appropriate hydrohalic acid in a chlorinated hydrocarbon solvent or in acetic acid. For example, treating 9β,11β-epoxy-1,4,6-pregnatriene-17α,21-diol-3,20-dione-21-acetate with hydrogen fluoride in acetic acid affords 9α-fluoro-1,4,6-pregnatriene-11β,17α-21-triol-3,20-dione-21-acetate, which is a powerful mineralocorticoid, as described in copending application of Gould and Herzog, Serial No. 580,475, filed April 25, 1956, or which itself may be transformed to the corresponding diene (which is known to be a potent corticoid according to Hirschmann et al., J. Am. Chem. Soc., 77, 3166 (1955)) by saturation of the 6,7-bond as described in copending application of Gould and Herzog, Serial No. 513,901, filed June 7, 1955.

The 20-hydroxylated compounds of the general formula may be prepared by the reduction of the corresponding 20-keto analog by chemical or microbiological methods. For example, subjecting 9β,11β-epoxy-1,4,6-pregnatriene-17α,21-diol-3,20-dione to the microbiological action of *Corynebacterium simplex* reduction to the corresponding 20β-hydroxyl compound occurs.

Similarly, the 20α-hydroxyl compounds are prepared by the microbiological reduction utilizing a yeast of the species *Rhodotorulla rubra*, N. R. R. L. Y-2343.

Chemically, the 20β-hydroxyl analogs may be prepared by direct reduction with one equivalent of a mild reducing agent such as sodium borohydride according to the following sequence:

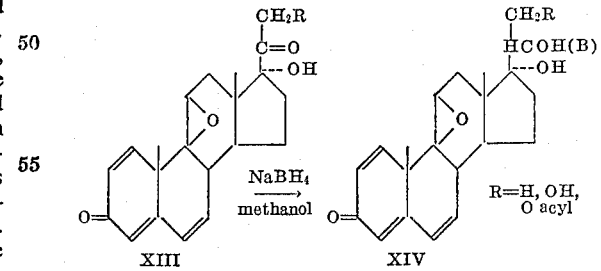

In the foregoing reaction a 20-keto compound, as exemplified by XIII, is treated with one equivalent of sodium borohydride in methanol-dioxane solvent and the product obtained is principally the 20β-hydroxyl isomer. Some 20α-hydroxylation occurs in this reaction but to such a small extent that separation and purification of the 20β-hydroxyl compound XIV is easily effected by known chromatographic or crystallization techniques.

These 20-hydroxylated compounds embraced by the general formula may also be reacted with hydrogen halide thus forming a 9α-halo-11-oxygenated steroid with the 17,20,21-triol side chain. Specifically, treating 9β,-11β-epoxy-1,4,6-pregnatriene-17α,20(α or β),21-triol-3-one with hydrogen fluoride in the known manner for opening a 9,11-epoxide link affords the corresponding 9α-fluoro-1,4,6-pregnatriene-11β,17α,20 (α or β),21-tetrol-3- one. Similarly, treating 9β,11β-epoxy-1,4,6-pregnatriene-17α,20 (α or β)-diol-3-one with hydrogen bromide affords 9α-bromo-1,4,6-pregnatriene-11β,17α,20 (α or β)-triol-3-one. These 9α-halogenated 20-hydroxylated pregnatrienes are physiologically useful in the treatment of inflammatory diseases in that they exhibit a more favorable ratio of glycogenic effect to salt retention.

Although the 20-hydroxylated compounds are preferably prepared from the corresponding 20-keto analogs, one of the major uses of the 20-hydroxy substances is transformation to the 20-ketone. For example, opening the epoxide link under acid conditions sometimes causes rearrangement of a 17α,21-diol-20-one side chain. Thus it is sometimes preferable to reduce the 20-ketone, effect opening of the epoxide link and then subsequently reoxidize the 20-hydroxyl to a 20-keto group.

The methods of preparation of the compounds of the general formula described heretofore have, for the most part, utilized compounds possessing an oxygen function at C-21, however, it is to be understood that the corresponding 21-desoxy substances may be used in those instances wherein a 21-desoxy product is desired. It is also possible to convert the C-21 oxygenated compounds of our invention to their corresponding C-21 desoxy analogs. Such a conversion is shown in the following reaction:

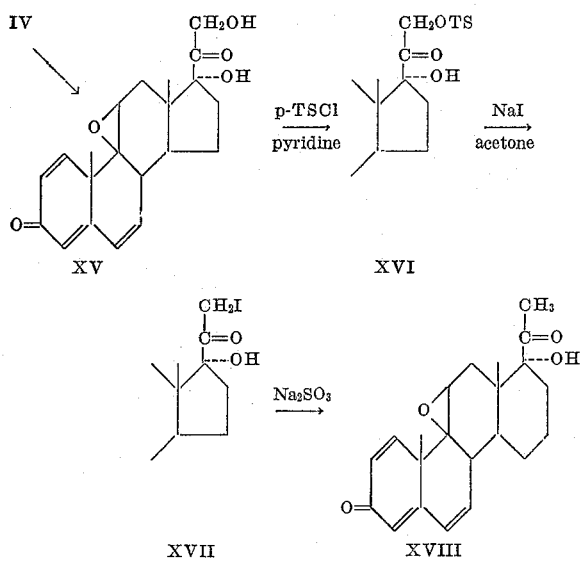

In this reaction, 9β,11β-oxido-1,4,6-pregnatriene-17α,21-diol-3,20-dione 21-acetate (IV) is saponified to the corresponding 21-ol (XV). Treating XX with a sulfonating agent such as p-toluenesulfonyl chloride in pyridine (or methanesulfonyl chloride in methylene chloride), affords the corresponding C-21 tosylate XVI. With the latter reagent, a C-21 methylsulfonate is obtained. The tosylate is replaced by iodine by means of sodium iodide in acetone (XVII) which upon subsequent reaction with acidified sodium sulfite solution yields the 21-desoxy compound XVIII.

Upon treating compound XVIII with hydrohalic acid such as hydrogen fluoride, the corresponding 9α-fluoro-11β-hydroxyl pregnatriene is prepared. This substitution of a hydrogen atom for a hydroxyl group at C-21 results in a greater decrease of salt retainnig activity than of glucocorticoid activity.

In the foregoing discussions relating to the compounds of our invention containing an esterified hydroxyl function at C-21, we have, for clarity, only shown lower alkanoic moieties such as acetate. It is to be understood, however, that almost any ester grouping may be present at C-21 in carrying out the synthetic steps and, in some cases, certain ester groups are preferred. For example, if the compound of our invention is prepared as an intermediate for a therapeutically active substance containing a C-21 t-butyl furoate group or cyclopentylpropionate group and the like, it may be expedient to insert that function at the first step of the synthesis wherein C-21 esterification occurs. Thus we envision ester groups may be present at C-21 which arise from lower alkanoic acid radicals and cycloaliphatic alkanoic radicals such as acetate, propionate, isovalerate, enanthate and cyclopentylpropionate. In view of the fact that we have found that esterification of therapeutically active substances generally results in extension of duration of activity over that exhibited by the free C-21 alcohol we also include aryloxy alkanoic acid radicals and heterocyclic carboxylic acid radicals arising from acids such as phenoxyacetic, 4-bromophenoxyacetic, 4-methylphenoxyacetic, 4-t-butylphenoxyacetic, 2,4,5-trichlorophenoxyacetic, furoic, 5-bromofuroic, 5-methylfuroic and 5-t-butylfuroic acids and the like.

The following examples indicate methods for preparing the compounds of our invention. However, it is to be understood that said examples are given merely by way of illustration and our invention is limited only as defined in the appending claims.

EXAMPLE 1

*6 - bromo - 9β,11β - oxido - 1,4 - pregnadiene - 17α,21-diol-3,20-dione-21-acetate*

A solution of 2 g. of 9β,11β-oxido-1,4-pregnadiene-17α,21-diol-3,20-dione-21-acetate (prepared according to the procedure described in J. Am. Chem. Soc. 77, 4181 (1955)) in 100 ml. of chlorobenzene and 50 ml. of carbon tetrachloride is dried by distilling 5 ml. of the solvent. To the solution is added 0.93 g. of N-bromosuccinimide and the mixture is refluxed for 15 minutes under irradiation from a 300-watt photoflood lamp. During this period, succinimide crystallizes out of the solution. The mixture is cooled and shaken with water. The organic layer is separated, dried with anhydrous magnesium sulfate, and evaporated, in vacuo, yielding 6-bromo, 9β,11β-oxido - 1,4 - pregnadiene - 17α,21 - diol - 3,20- dione - 21-acetate. (In the ultraviolet absorption spectrum the compound exhibits a maximum at 245 mμ.)

EXAMPLE 2

*9β,11β - oxido - 1,4,6 - pregnatriene - 17α,21 - diol - 3,20-dione-21-acetate*

To 15 ml. of refluxing dry γ-collidine is added 500 mg. of the bromo compound of Example 1. The mixture is refluxed for 30 minutes after which time it is cooled, poured into ice water and the pH is adjusted to 4–6 with dilute hydrochloric acid. The acidified mixture is extracted three times with 25 ml. of methylene chloride and the organic layer is washed with water, dried with anhydrous magnesium sulfate, filtered, and evaporated to a residue. The residue is dissolved in a minimum quantity of methylene chloride and chromatographed on magnesium silicate using normal hexane as the developer. Elution with varying concentrations of ether-hexane solutions affords the compound of this example primarily in the 70% ether-30% hexane fraction. The compound of this example is further purified by crystallization from acetone-hexane. Its ultraviolet spectrum exhibits maxima at 223, 255, and 297 mμ.

EXAMPLE 3

*9α-fluoro - 1,4,6 - pregnatriene - 11β,17α,21 - triol-3,20-dione-21-acetate*

A solution of 10 ml. of alcohol-free chloroform containing 200 mg. of the oxido compound of Example 2 is chilled to 0° and treated with 100 mg. of anhydrous hydrogen fluoride. The mixture is maintained at 0° for 5 hours after which time it is thoroughly extracted with dilute sodium bicarbonate solution and water, until the washings test neutral. The organic layer is dried over anhydrous magnesium sulfate, filtered and evaporated to a residue. Recrystallization of the residue from methylene chloride-hexane affords the compound of this example which exhibits ultraviolet absorption maxima at 222, 254, and 298 mµ.

EXAMPLE 4

*9β,11β-oxido - 1,4,6 - pregnatriene-17α,21-diol-3,20-dione*

A solution of 500 mg. of the ester obtained in Example 2 in 10 ml. of methanol is maintained under a nitrogen atmosphere and treated with 1.2 equivalents of potassium bicarbonate, previously dissolved in 1 ml. of water and diluted with 9 ml. of methanol. The mixture is stirred at room temperature overnight after which time the methanol is removed in vacuo. The aqueous residue is diluted with water and the mixture is filtered. The precipitate so obtained is recrystallized from acetone-hexane, affording 9β,11β-oxido-1,4,6-pregnatriene-17α,21-diol-3,20-dione, which exhibits maxima at 223, 255, and 297 mµ in the ultraviolet absorption band.

EXAMPLE 5

*9β,11β-oxido-1,4,6-pregnatriene - 17α,21-diol-3,20-dione-21-propionate*

A chilled solution of 500 mg. of the free 21-alcohol obtained in Example 4 in 10 ml. of anhydrous pyridine is treated with 1–1.1 equivalents of propionyl chloride. The mixture is stirred at room temperature overnight at the end of which time it is diluted with water. The solid which separates is removed by filtration and recrystallized from acetone-hexane affording the 21-propionate hereinabove identified.

In similar fashion, 21-esters may be prepared of the following acids using correspondingly equivalent quantities of the appropriate acid chloride such as butyryl, benzoyl, phenoxyacetyl, furoyl, cyclopentylpropionyl chloride and the like.

EXAMPLE 6

*9β,11β - oxido-1,4,6-pregnatriene-17α,21-diol-3,20-dione 21-p-toluenesulfonate*

A sample of 5 g. of the compound obtained in Example 4 is dissolved in 50 ml. of dry pyridine and the solution is chilled to −72°. A chilled solution of 2.95 g. of p-toluenesulfonyl chloride in 15 ml. of benzene and 30 ml. of methylene chloride is added. The mixture is swirled to obtain complete solution and stirred at −15° for 18 hours. The solution is then diluted with 100 ml. of methylene chloride, washed with water, dilute sulfuric acid, sodium bicarbonate solution and water, in turn, until neutral, and dried over anhydrous magnesium sulphate. After filtration and evaporation of the solvent, the residue is crystallized from methanol affording 9β,11β-oxido-1,4,6-pregnatriene-17α,21-diol - 3,20 - dione 21-p-toluenesulfonate.

In similar fashion, by substituting 1.75 g. of methanesulfonyl chloride in 17 ml. of methylene chloride in the foregoing synthesis, the 21-methanesulfonate is obtained which is crystallized from benzene-methanol solvent.

EXAMPLE 7

*21-iodo-9β,11β-oxido - 1,4,6 - pregnatriene-17α-ol-3,20-dione*

To a solution of 2 g. of the 21-sulfonate obtained in Example 6, in 10 ml. of acetone is added a solution of 2 g. of sodium iodide in 15 ml. of acetone. The mixture is refluxed 7 minutes during which time crystals begin to form. After concentration to a small volume, there is added sufficient 5% aqueous sodium thiosulfate to decolorize the solution, followed by 25 ml. of water. The resultant white precipitate is collected on a filter, washed with water and dried in vacuo to give 21-iodo-9β,11β-oxido-1,4,6-pregnatriene-17α-ol-3,20-dione.

EXAMPLE 8

*9β,11β-oxido-1,4,6-pregnatriene-17α-ol-3,20-dione*

To a solution of 2 g. of the product of Example 7 in 40 ml. of dioxane is added with one drop of concentrated hydrochloric acid followed by the dropwise addition of 5.5 ml. of an aqueous 10% solution of sodium sulfite until no further color develops on standing. The reaction mixture is concentrated to 10 ml. in vacuo and diluted with 30 ml. of water. The precipitate so formed is filtered off, dried, and crystallized from acetone-hexane to give 9β,11β-oxido-1,4,6-pregnatriene-17α-ol-3,20-dione.

EXAMPLE 9

*9α-fluoro-1,4,6-pregnatriene-11β,17α-diol-3,20-dione*

A sample of 0.2 g. of the product of Example 8 is dissolved in 10 ml. of alcohol-free chloroform, chilled to 0° and treated with 2 ml. of chloroform containing 0.2 g. of anhydrous hydrogen fluoride. The solution is held at 0° for five hours, and then washed twice with dilute sodium bicarbonate and twice with water till neutral. The organic layer is dried over magnesium sulfate, filtered and evaporated to a residue which is crystallized from methylene chloride-hexane to give 9α-fluoro-1,4,6-pregnatriene-11β,17α-diol-3-20-dione.

In similar fashion, by substituting an equivalent quantity of hydrogen bromide or hydrogen chloride in the foregoing, the corresponding 9α-bromo- or 9α-chloro-pergnatriene respectively, is obtained.

EXAMPLE 10

*9β,11β-oxido - 1,4,6 - pregnatriene-17α,20β,21-triol-3-one*

To a mixture containing 3.0 g. of yeast extract (Difco), 4.49 g. of potassium dihydrogen phosphate, 8.83 g. of disodium hydrogen phosphate heptahydrate and 1 l. of tap water is added one loopful of cell material from an agar slant prepared by growing a culture of *Corynebacterium simplex* (A. T. C. C. 6946) on 1% yeast extract-dextrose agar and the resulting mixture is incubated for 18–24 hours. One ml. of the resulting culture is used as a standard inoculum for the medium for steroid transformation.

A mixture of 1 g. of yeast extract (Difco) plus 10 g. of concentrated fish solubles in 1 l. of tap water, the pH of which is adjusted to 6.8–7.0, is distributed among ten 300 ml. Erlenmeyer flasks and to each flask is added the standard inoculum. The resulting suspensions are incubated at 30° on a shaking machine and growth is followed turbidimetrically. 9β,11β-oxido - 1,4,6-pregnatriene-17α, 21-diol-3,20-dione (1.0 g.) is dissolved in 20 ml. of acetone and the resulting solution is distributed equally among the ten flasks when the peak of the log phase of growth of the organism is reached. After a 48-hour incubation period, the combined broths are extracted twice with 200 ml. of chloroform and the extract is dried, filtered and evaporated. The residue is crystallized from acetone-hexane to give 9β,11β-oxido-1,4,6-pregnatriene-17α,20β,21-triol-3-one.

EXAMPLE 11

*9β,11β-oxido-1,4,6-pregnatriene-17α,20β,21-triol-3-one 21-acetate*

A sample of 0.05 g. of the product of Example 10 is dissolved in 2 ml. of dry pyridine and treated with 0.14 ml. of a 10% solution of acetic anhydride in glacial acetic acid. After standing 6 hours at room temperature, the mixture is poured into excess dilute sulfuric acid, and the precipitate is filtered off and dried. Recrystallization from aqueous acetone gives 9β,11β-oxido-1,4,6-pregnatriene-17α,20β,21-triol-3-one 21-acetate.

If the foregoing is carried out using 0.5 ml. of 10% acetic anhydride in acetic acid, the product obtained on crystallization from aqueous methanol is 9β,11β-oxido-1,4,6-pregnatriene-17α,20β,21-triol-3-one 20,21-diacetate.

EXAMPLE 12

*9β,11β-oxido-1,4,6-pregnatriene-17α,20α,21-triol-3-one*

A culture of *Rhodotorulla rubra* (N. R. R. L.—Y-2343), is grown under sterile conditions on an agar slant consisting of a 3% yeast extract dextrose agar media. The pH is adjusted with sodium hydroxide solution to 7.0 and incubation is carried out for 7 days at 28°.

To the slant is added 5–10 ml. of a sterile medium, having the following composition:

| | | |
|---|---|---|
| Edamin | gm | 20 |
| Corn steep liquor | gm | 3 |
| Dextrose | gm | 50 |
| Tap water | cc | 1000 |

(pH adjusted to 5.3).

An inoculum is prepared by placing 5 ml. of the above culture mixture in a 300 ml. Erlenmeyer flask containing 100 ml. of the aforementioned growth media. The flask and contents is shaken on a rotary shaker for 24 hours at 28°.

Into each of ten 300 ml. Erlenmeyer flasks containing 100 ml. of growth media is placed, under sterile conditions, 10 ml. of the inoculum and the flasks and contents are shaken for three days at 28° during which time growth of the organism occurs. Into each flask is added 50 mg. of the compound of Example 4 in 2 ml. of ethanol. Maintaining sterile conditions, the fermentation is carried out by shaking the flasks on a rotary shaker for 5–10 days at 28°, at the end of which time paper chromatography indicates complete transformation from starting material. The contents of the flasks are pooled and added to an equal volume of chloroform. The mixture is stirred and boiled for approximately 5–10 minutes and the layers are separated. The extraction process is repeated again and the chloroform solutions are combined, dried and evaporated to a residue. Recrystallization from acetone-hexane affords 9β,11β-oxido-1,4,6-pregnatriene-17α,20α,21-triol-3-one.

EXAMPLE 13

*9β,11β-oxido-1,4,6-pregnatriene-17α,20α,21-triol-3-one 21-acetate*

Following the procedure of Example 11 and using the product of Example 12, there is obtained 9β,11β-oxido-1,4,6 - pregnatriene - 17α,20α,21 - triol - 3 - one 21-acetate, which is purified by recrystallization from aqueous acetone.

In similar fashion as in Example 11, if an excess of acetic anhydride and acetic acid is employed, the product obtained by crystallization from aqueous methanol is 9β,11β-oxido - 1,4,6 - pregnatriene - 17α,20α,21 - triol-3-one 20,21-diacetate.

EXAMPLE 14

*9β,11β-oxido-1,4,6-pregnatriene-17α,20β-diol-3-one*

By employing the product of Example 8 in the reductive microbiological process described in Example 10, there is obtained upon recrystallization from acetone-hexane 9β,11β-oxido-1,4,6 - pregnatriene - 17α,20β - diol-3-one, as a white crystalline solvent.

Treating the product so obtained with pyridine, acetic anhydride and glacial acetic acid, as described in Example 11, results in the formation of 9β,11β-oxido-1,4,6-pregnatriene - 17α,20β-diol-3-one 20-acetate, which is purified by recrystallization from aqueous acetone.

EXAMPLE 15

*9β,11β-oxido-1,4,6-pregnatriene-17α,20α-diol-3-one*

By utilizing the product of Example 8 in the procedure described in Example 12 whereby microbiological reduction is effected by means of *Rhodotorulla rubra* (N. R. R. L.—Y-2343), there is obtained 9β,11β-oxido - 1,4,6-pregnatriene-17α,20α-diol-3-one.

Acylation with acetic anhydride in acetic acid and pyridine, as described in Example 11, gives rise to 9β,11β-oxido-1,4,6-pregnatriene - 17α,20α - diol-3-one 20-acetate, which is purified by recrystallization from aqueous acetone.

We claim:

1. Steroid compounds having the following formula:

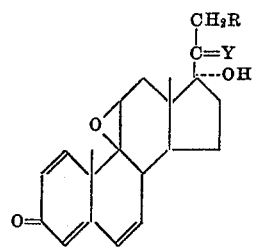

wherein R is a member of the group consisting of H, OH and OZ, Y is a member of the group consisting of O,

and

and Z is a member of the group consisting of H and lower alkanoic acid radicals.

2. 9β,11β-epoxy-1,4,6-pregnatriene-17α,21 - diol - 3,20-dione.

3. 9β,11β-epoxy-1,4,6-pregnatriene-17α,21 - diol - 3,20-dione-21-acetate.

4. 9β,11β-oxido-1,4,6-pregnatriene-17α-ol-3,20 - dione.

5. 9β,11β-oxido-1,4,6-pregnatriene - 17α,20β,21 - triol-3-one.

6. 9β,11β-oxido-1,4,6-pregnatriene - 17α,20α,21 - triol-3-one.

7. In the process for preparing compounds having the following formula:

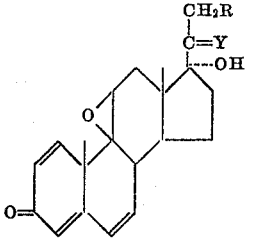

wherein R is a member of the group consisting of H, OH and OZ, Y is a member of the group consisting of O,

and

and Z is a member of the group consisting of H and lower alkanoic acid radicals, the steps which comprise halogenating a compound of the formula:

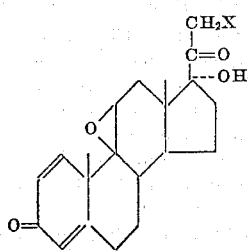

wherein X is a member of the group consisting of H and lower alkanoic acyloxy, dehydrohalogenating the ring B-secondary halide so formed and isolating the 9β,11β-epoxy-1,4,6-pregnatriene thereby produced.

8. The steps in the process according to claim 7 including reducing the 20-keto function and isolating the 9β,11β-epoxy-20-hydroxy-1,4,6-pregnatriene so formed.

No references cited.